US009670840B2

(12) United States Patent
Plante et al.

(10) Patent No.: US 9,670,840 B2
(45) Date of Patent: Jun. 6, 2017

(54) ROTOR ASSEMBLY HAVING A CONCENTRIC ARRANGEMENT OF A TURBINE PORTION, A COOLING CHANNEL AND A REINFORCEMENT WALL

(75) Inventors: Jean-Sebastien Plante, Sherbrooke (CA); David Rancourt, Grand-Mère (CA); Mathieu Picard, St-Jean-sur Richelieu (CA)

(73) Assignee: SOCPRA—SCIENCE ET GENIE, S.E.C., Sherbrooke (CA)

( * ) Notice: Subject to any disclaimer, the term of this patent is extended or adjusted under 35 U.S.C. 154(b) by 429 days.

(21) Appl. No.: 14/346,579

(22) PCT Filed: Sep. 11, 2012

(86) PCT No.: PCT/CA2012/000838
§ 371 (c)(1),
(2), (4) Date: Apr. 14, 2014

(87) PCT Pub. No.: WO2013/040679
PCT Pub. Date: Mar. 28, 2013

(65) Prior Publication Data
US 2014/0230443 A1    Aug. 21, 2014

Related U.S. Application Data

(60) Provisional application No. 61/538,201, filed on Sep. 23, 2011.

(51) Int. Cl.
*F02C 3/16* (2006.01)
*F02C 3/073* (2006.01)
(Continued)

(52) U.S. Cl.
CPC ............... *F02C 3/16* (2013.01); *F01D 5/022* (2013.01); *F02C 3/073* (2013.01); *F02C 3/145* (2013.01);
(Continued)

(58) Field of Classification Search
CPC .. F01D 5/022; F01D 5/06; F02C 3/073; F02C 3/145; F02C 3/16; F02C 5/04; F02K 7/10; F05D 2220/34
(Continued)

(56) References Cited

U.S. PATENT DOCUMENTS 2,831,320 A * 4/1958 Duncan ................... F02K 7/005
60/39.35
3,269,120 A    8/1966 Sabatiuk
(Continued)

FOREIGN PATENT DOCUMENTS

EP          0568748 A1    11/1993
FR          2613772 A1    10/1988
(Continued)

OTHER PUBLICATIONS

Warwick G: "D-Star's Nested Gas Turbine Offers Compact Performance Manufacturer Claims Novel Design has Weight Advantage Over Conventional Powerplants", Flight International, Reed Business Information, Sutton Surrey, GB, vol. 165, No. 4937, Jun. 8, 2004 (Jun. 8, 2004), p. 31.
(Continued)

*Primary Examiner* — Bryon Gehman
(74) *Attorney, Agent, or Firm* — Norton Rose Fulbright Canada LLP

(57) ABSTRACT

The present disclosure introduces a rotor assembly having a concentric arrangement comprising a rotating turbine portion, a cooling channel and an annular reinforcement wall. The concentric arrangement is configured to rotate around a common axis. Also introduced is a rotary engine comprising the rotor assembly, in which the cooling channel further functions as a rotating compressor portion. The rotary engine also comprises a stator assembly that itself comprises a static turbine portion positioned upstream of the rotating
(Continued)

turbine portion, a static compressor portion positioned downstream of the rotating compressor portion, and a combustion chamber positioned downstream of the static compressor portion and upstream of the static turbine portion.

25 Claims, 12 Drawing Sheets

(51) Int. Cl.
*F02C 3/14* (2006.01)
*F01D 5/02* (2006.01)

(52) U.S. Cl.
CPC ......... *F05D 2220/34* (2013.01); *Y02T 50/672* (2013.01)

(58) Field of Classification Search
USPC ........ 60/39.34, 39.35, 39.43, 670, 727, 767, 60/768, 772, 39.44, 645; 123/241, 562; 415/116
See application file for complete search history.

(56) References Cited

U.S. PATENT DOCUMENTS

| | | | |
|---|---|---|---|
| 3,635,577 A | 1/1972 | Dee | |
| 4,017,209 A | 4/1977 | Bodman | |
| 5,037,273 A | 8/1991 | Krueger et al. | |
| 5,224,339 A | 7/1993 | Hayes | |
| 6,430,917 B1 | 8/2002 | Platts | |
| 6,647,707 B2 * | 11/2003 | Dev | F02C 3/045 60/39.43 |
| 7,337,606 B2 | 3/2008 | Brouillette et al. | |
| 7,393,182 B2 | 7/2008 | Matheny | |
| 7,578,655 B1 | 8/2009 | Matheny | |
| 7,685,824 B2 | 3/2010 | Dahm | |
| 8,695,565 B2 * | 4/2014 | Wright | F01C 1/22 123/241 |
| 2004/0020185 A1 | 2/2004 | Brouillette et al. | |
| 2014/0290259 A1 * | 10/2014 | Plante | F02K 7/10 60/767 |

FOREIGN PATENT DOCUMENTS

| | | |
|---|---|---|
| GB | 884646 A | 12/1961 |
| GB | 2069065 A | 8/1981 |
| GB | 3069065 A | 8/1981 |
| WO | 02/35072 A2 | 5/2002 |

OTHER PUBLICATIONS

Lapsa et al., "Hyperacceleration effects on turbulent combustion in premixed step-stabilized flames", Proceedings of the Combustion Institute, vol. 32, No. 2, pp. 1731-1738, 2009.

* cited by examiner

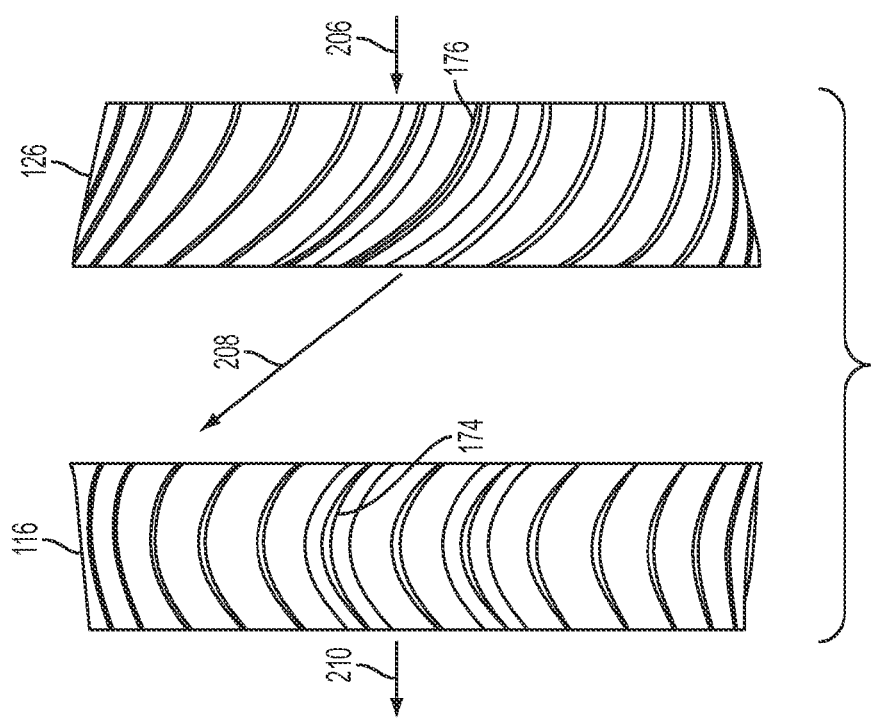
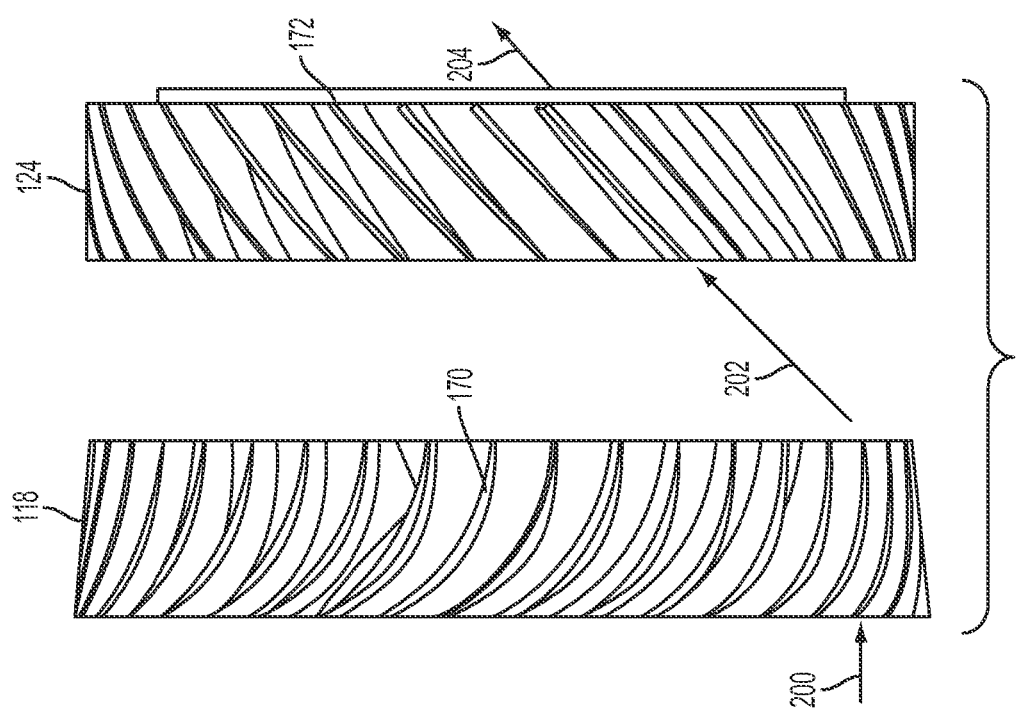

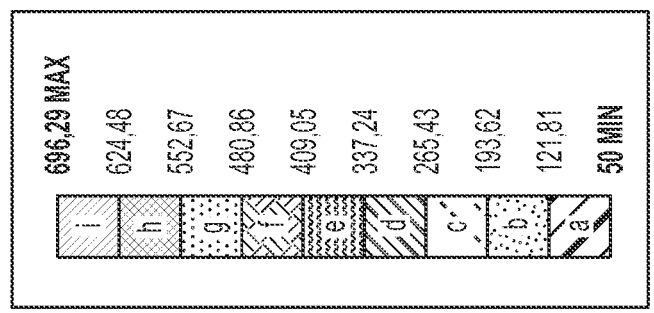
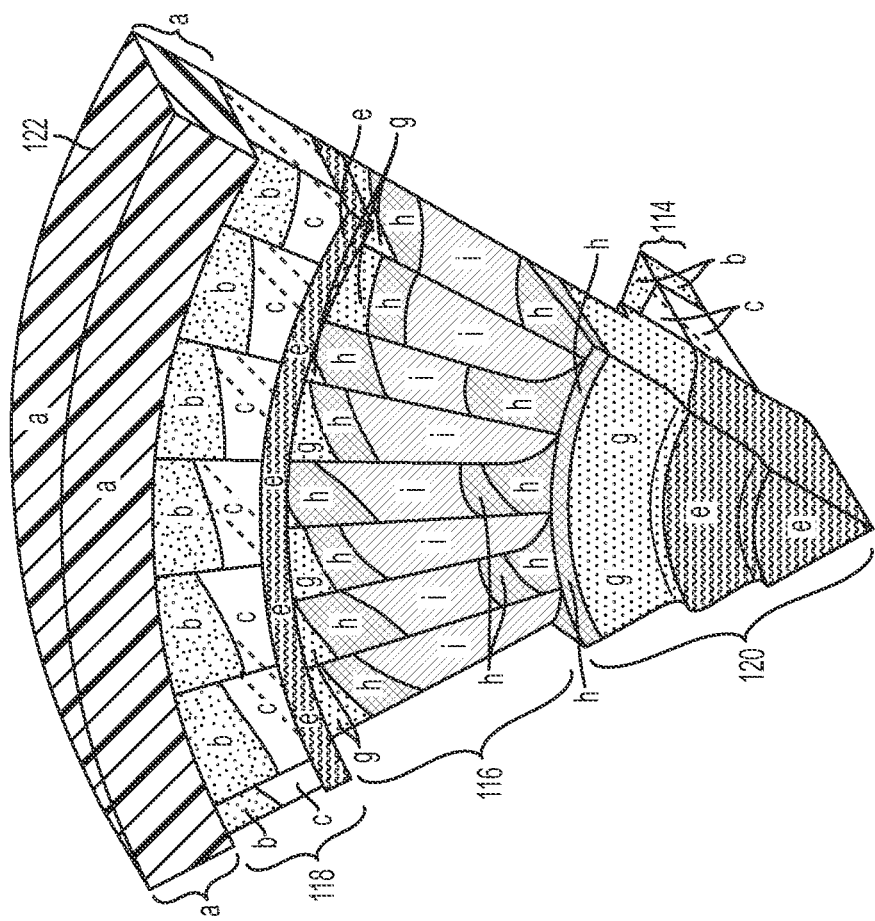
FIG. 7

ROTOR ASSEMBLY HAVING A CONCENTRIC ARRANGEMENT OF A TURBINE PORTION, A COOLING CHANNEL AND A REINFORCEMENT WALL

TECHNICAL FIELD

The present disclosure relates to the field of gas turbines. More specifically, the present disclosure relates to a rotor assembly comprising a concentric arrangement of a turbine portion, a cooling channel, and a reinforcement wall, and to a rotary engine comprising the rotor assembly.

BACKGROUND

Ramjet engines used in aerospace applications ingest air into an engine inlet at supersonic speeds caused by the forward motion of an airplane or missile. The air is rammed into a smaller opening between a center-body and an engine side wall generating a series of shock waves. These shock waves compress and decelerate the air to subsonic speeds while, at the same time, dramatically raising working flow pressure and temperature.

The ramjet effect may also be achieved in a stationary platform by passing an accelerated flow of air over raised sections machined on the rim of a rotor disc. Combined with the high rotation rate of the rotor, this produces a supersonic flow relative to the rotor rim. Interaction between the raised sections of the rim which are rotating at supersonic speeds and the stationary engine case creates a series of shock waves that compress the air stream in a manner similar to ramjet inlets on a supersonic missile or aircraft.

The advent of carbon composite and like materials has enabled the introduction of a rotating reinforcement wall, called rim-rotor, for compensating centrifugal forces generated by rotating components of the ramjet engine. In a rim-rotor rotary ramjet engine (R4E), inlet blades compress the air and fuel mixture with shockwaves, combustion takes place to increase the flow enthalpy and finally the products are accelerated by outlet blades at a high tangential speed to generate shaft power. An example of such an engine is described in U.S. Pat. No. 7,337,606, the disclosure of which is incorporated herein in its entirety.

Increased power density from a simple and compact engine design is still a desirable goal and improvements to gas turbines are still being sought.

SUMMARY

The present disclosure introduces a rotor assembly comprising a concentric arrangement of a turbine portion, a cooling channel and an annular reinforcement wall, the concentric arrangement being configured to rotate around a common axis.

According to the present disclosure, there is also provided a rotary engine comprising a rotor assembly that, in turn, comprises a rotating turbine portion positioned for revolving around an axis of the rotary engine, a rotating compressor portion encircling the rotating turbine portion, and an annular reinforcement wall encircling the rotating compressor portion. The rotary engine also comprises a stator assembly that, in turn, comprises a static turbine portion positioned upstream of the rotating turbine portion for communication therewith, and a static compressor portion positioned downstream of the rotating compressor portion for communication therewith. The rotary engine further comprises a combustion chamber positioned downstream of the static compressor portion and upstream of the static turbine portion for communication therewith.

The present disclosure also provides a rotor assembly for a rotary engine. The rotor assembly comprises a rotating turbine portion positioned for revolving around an axis of the rotary engine, a rotating compressor portion encircling the rotating turbine portion, and an annular reinforcement wall encircling the rotating compressor portion.

The present disclosure further relates to a rotor assembly for a rotary engine. The rotor assembly comprises a rotating turbine portion positioned for revolving around an axis of the turbine stage, a cooling channel encircling the rotating turbine portion, and an annular reinforcement wall encircling the cooling channel.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 2a is a detailed view of a compressor of the rotary engine of FIG. 1;

FIG. 2b is a detailed view of a turbine of the rotary engine of FIG. 1;

FIG. 7 shows temperature gradients on a part of the rotor assembly of FIG. 6;

DETAILED DESCRIPTION

Figure 1:
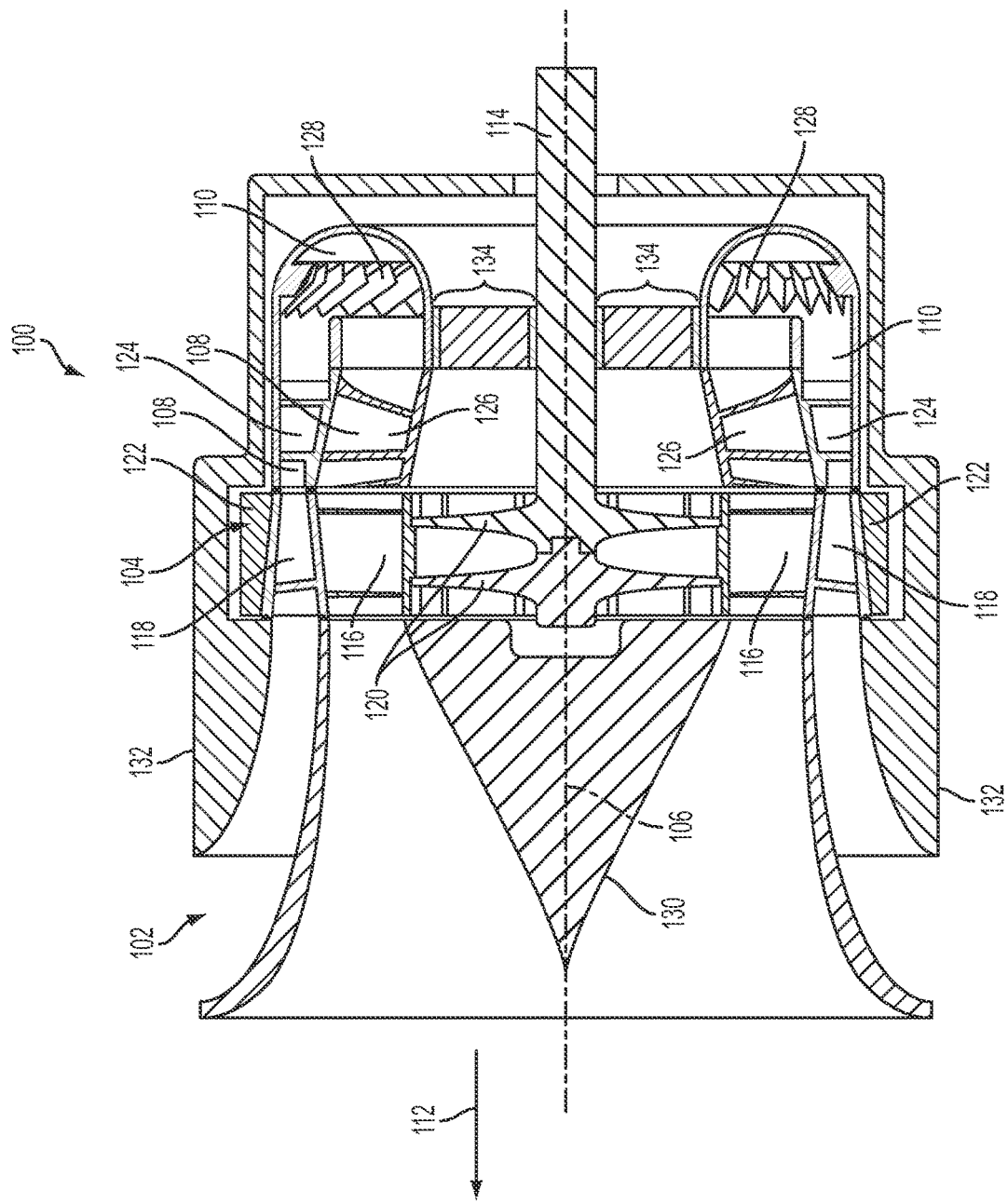
FIG. 1 is a side elevation, cutaway view of an example of rotary engine.

The present disclosure introduces a rotor assembly comprising a concentric arrangement of a turbine portion, a cooling channel and an annular reinforcement wall, the concentric arrangement being configured to rotate around a common axis.

The present disclosure also introduces a rotor assembly for a rotary engine. The rotor assembly comprises a rotating turbine portion, a rotating compressor portion and an annular reinforcement wall. These elements are stacked one on top of the other in a concentric fashion, with the rotating turbine portion revolving around an axis of the rotary engine, the rotating compressor portion encircling the rotating turbine portion and the annular reinforcement wall encircling the rotating compressor portion.

Also introduced is a single stage, high power density rotary engine that comprises a single rotor assembly as described hereinabove. The rotary engine also comprises a stator assembly that itself comprises a static turbine portion positioned upstream of the rotating turbine portion and a static compressor portion positioned downstream of the rotating compressor portion. Gases may flow between the rotating and static compressor portions and between the static and rotating turbine portions. A combustion chamber is positioned downstream of the static compressor portion and upstream of the static turbine portion. Gases from the compressor may flow into the combustion chamber and therefrom into the turbine.

The rotating and static compressor portions may for example form a supersonic impulse compressor while the rotating and static turbine portions may form a supersonic impulse turbine, the rotary engine thus forming a supersonic gas turbine engine; other turbine configurations depend in a large part on geometries of blades within the are rotating and static compressor portions and also within the scope of the present disclosure. The rotary engine may comprise an inlet for delivering air into the rotating compressor portion, a fuel injection system for delivering fuel in the rotary engine, an ignition system for igniting an air and fuel mixture and an outlet for expelling combustion products from the rotating turbine portion. In an embodiment, air delivered through the inlet is accelerated by the rotating compressor portion. The static compressor portion then slows down the air, also increasing its pressure, before its admission into the combustion chamber. Following combustion of the air and fuel mixture in the combustion chamber, the static turbine portion converts a resulting pressure of the combustion products into kinetic energy. The rotating turbine portion then retrieves the kinetic energy from the static turbine portion. Depending on intended applications of the rotary engine, the kinetic energy may be converted into mechanical torque at an output shaft connected to the rotor assembly. For other applications, combustion products may be expelled from the rotating turbine portion, through the outlet, at a high kinetic energy level for generating thrust. In applications that generate engine thrust, the outlet may be positioned axially on the rotary engine while the inlet may be positioned radially on the rotary engine.

The annular reinforcement wall is made of resistant materials to compensate centrifugal forces generated by other components of the rotor assembly. Those of ordinary skill in the art having the benefit of the present disclosure will be able to select available materials capable of withstanding high temperatures. Combustion products flowing from the combustion chamber into the turbine are very hot. The rotating compressor portion shields the annular reinforcement wall from heat present in the rotating turbine portion.

Optionally, the combustion chamber may comprise one or more flameholders for stabilizing combustion of the air and fuel mixture. According to another option, the rotor assembly may comprise a protective layer positioned between the rotating compressor portion and the annular reinforcement wall.

As used herein, the expression "single rotor assembly" reflects the fact that the rotary engine may operate with at least one rotor. Of course, variations of the rotary engine may further comprise additional rotors used for the same or other purposes as the above described rotor assembly. As an example, the combustion chamber may optionally be made to rotate on a same axis as the rotor assembly.

The present disclosure further introduces a rotor assembly for a turbine stage of a rotary engine. This rotor assembly comprises a rotating turbine portion, a cooling channel and an annular reinforcement wall. These elements are stacked one on top of the other, in a concentric fashion, with the rotating turbine portion revolving around an axis of the rotary engine, the cooling channel encircling the rotating turbine portion and the annular reinforcement wall encircling the cooling channel.

Various embodiments of rotary engines and rotor assemblies, as disclosed herein, may be envisioned. One such embodiment is shown on FIG. 1, which is a side elevation, cutaway view of an example of rotary engine. A rotary engine 100 according to an embodiment comprises an air inlet 102, a rotor assembly 104 rotating about an axis 106 of the rotary engine 100, a stator assembly 108, a combustion chamber 110, an outlet 112 for burnt combustion products, and an output power shaft 114 for outputting power from the rotary engine 100. The rotor assembly 104, which may be mounted on a single hub 120 or on a pair of hubs 120, comprises an outer, annular reinforcement wall 122, also called a rim-rotor. The annular reinforcement wall 122 surrounds a rotating compressor portion 118 that itself surrounds a rotating turbine portion 116 mounted on the hubs 120. The annular reinforcement wall 122, the rotating compressor portion 118, the rotating turbine portion 116 the hubs 120 are thus arranged in a concentric fashion and revolve about the axis 106. The output power shaft 114 extends from the hubs 120. The rotor assembly 104, the hubs 120 and the output power shaft 114 all revolve about the rotation axis 106. The stator assembly 108 comprises a static compressor portion 124 and a static turbine portion 126. The combustion chamber 110 comprises a plurality of flameholders 128.

Air is forced into the rotary engine 100 through the inlet 102 and into the rotating compressor portion 118. High velocity air is delivered from the rotating compressor portion 118 into the static compressor portion 124 where kinetic energy of the air is converted into pressure. Air then enters the combustion chamber 110 at a relatively low velocity and at a high pressure. Fuel is delivered by an injection system (not shown) either within the inlet 102, within the static compressor portion 124 or directly into the combustion chamber 110. Ignition is initiated by an ignition system (not shown). One or more flameholders 128 within the combustion chamber 110 help stabilizing combustion of a mixture formed by the air and the fuel. Gaseous burnt combustion products are expelled from the combustion chamber 110 at very high temperature and pressure. The static turbine portion 126 converts this gas pressure into kinetic energy that is then retrieved by the rotating turbine portion 116. The output power shaft 114 being connected to the rotor assembly 104 via the hubs 120 converts the kinetic energy into mechanical torque, for turboshaft applications. A cone 130 guides the burnt combustion products from the rotating turbine portion 116 through the outlet 112. As shown in FIG. 1, a majority of parts of the rotary engine 100 are enclosed within a casing 132.

Those of ordinary skill in the art will appreciate that the rotary engine 100 may be adapted for turbofan applications where engine thrust is desired, for example for applications in which jet propulsion is desired. Adaptations of the geometries and sizes of the static and rotating compressor and turbine portions may be made so that the combustion products are expelled from the rotating turbine portion 116, through the outlet 112, at high kinetic energy level for generating thrust. In such applications, some mechanical torque may still be present on the output power shaft 114, for example for purposes of driving ancillary equipment (not shown) attached to the rotary engine 110. In thrust generating applications, the rotary engine 110 of FIG. 1 may be modified so that the air inlet 102 is moved away from the outlet 112, for example by generally positioning the inlet 102 radially on the casing 132 while the outlet 112 remains positioned along the rotation axis 106.

FIG. 2a is a detailed view of a compressor as in the rotary engine of FIG. 1. FIG. 2b is a detailed view of a turbine as in the rotary engine of FIG. 1. FIGS. 2a and 2b may be considered at once for understanding of the way gas flows through various parts of the rotary engine 100; however, scaling is approximate between FIGS. 2a and 2b. Also, it should be understood that the rotating turbine portion 116 is inserted co-axially within the rotating compressor portion 118 while the static turbine portion 126 is inserted co-axially within the static compressor portion 124. Additionally, rotating and static parts of the compressor (FIG. 2a) and of the turbine (FIG. 2b) are shown as if separated by large spacings. As shown earlier in FIG. 1, these elements are in fact closely adjacent to each other.

The rotating compressor portion 118 comprises blades 170, the static compressor portion 124 comprises blades 172, the rotating turbine portion 116 comprises blades 174, and the static turbine portion 126 comprises blades 176. The various blades of the compressor and turbine portions are shaped according to their intended usage. As illustrated, the blades 170 and 172 of the rotating compressor portion 118 and of the static compressor portion 124 are shaped to provide a supersonic compressor generating chock waves in the stator assembly 108. Other geometries and configurations (not shown) of the blades 170 and 172 may provide a supersonic compressor with chock in the rotor, an impulse compressor, a reaction compressor, a subsonic compressor, an impulse turbine, a reaction turbine, and the like. Yet other geometries and configurations (not shown) of the blades 170 and 172 may be such that the blades 170 and 172 channel air toward the turbine without substantially compressing the air, as will be explained in more details hereinbelow. The shapes of the blades as illustrated on FIGS. 2a and 2b as well as on other Figures are given for the purpose of example only and it is expected that those of ordinary skill in the art will be able to build other shapes of blades according to the needs of specific applications.

The rotating compressor portion 118 revolves at a high speed. Air from the inlet 102 enters in a direction indicated by arrow 200 at low speed and at atmospheric pressure. The blades 170 induce the air to exit the rotating compressor portion 118 at high speed, for example at 1000 meters per second, in the direction of arrow 202. The air then flows through the static compressor portion 124 where the blades 172 force the air to adopt a high pressure and a low speed, exiting in the direction of arrow 204, to then enter the combustion chamber 110. Combustion products from the combustion chamber 110 enter the static turbine portion 126, in a direction indicated by arrow 206, at high pressure and low speed. This pressure in converted into kinetic energy by the blades 176 within the static turbine portion 126. The combustion products follow the direction of arrow 208 into the rotating turbine portion 116 where the kinetic energy is retrieved by the blades 174. The combustion products then exit the rotating turbine portion 126 in the direction of arrow 210 toward the outlet 112. The combustion products may exit the rotating turbine portion 116. The combustion products are expelled at a relatively low speed for applications where mechanical torque is transferred by the turbine onto the output power shaft 114. Alternatively, for thrust generating applications, the rotary engine 100 may be considered a gas generator and the combustion products may be expelled while still having significant energy in terms of pressure or in terms of velocity. In other embodiments, kinetic energy left in the flow exiting the rotating turbine portion 116 may be retrieved using a second stage turbine (not shown) revolving at a different speed from that of the rotor assembly 104, the second stage turbine transferring the leftover kinetic energy to the output power shaft 114 or to another output shaft.

Figure 3B:
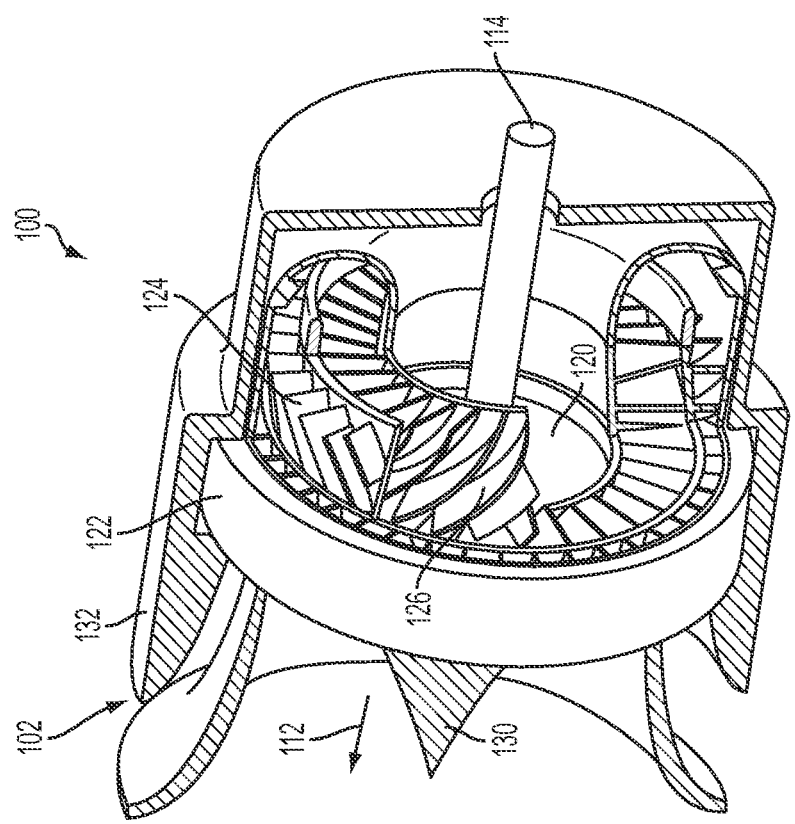
FIG. 3b is another rear perspective, partial cutaway view of the rotary engine of FIG. 1, showing details of a stator assembly.
Figure 3A:
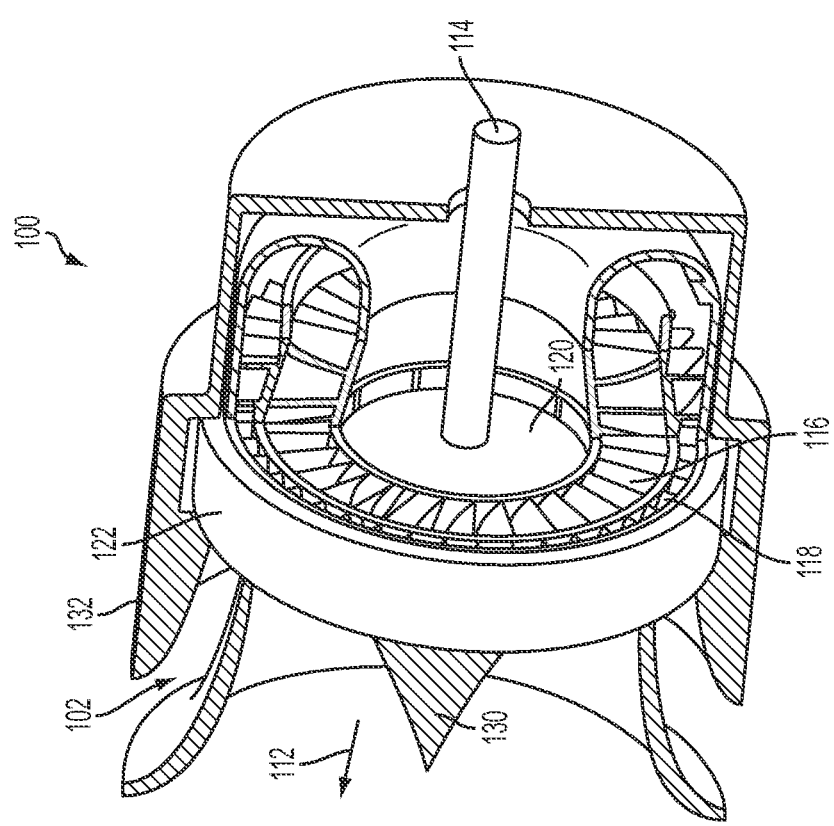
FIG. 3a is a rear perspective, partial cutaway view of the rotary engine of FIG. 1.

FIG. 3a is a rear perspective, partial cutaway view of the rotary engine of FIG. 1. FIG. 3b is another rear perspective, partial cutaway view of the rotary engine of FIG. 1, showing details of a stator assembly. Both FIGS. 3a and 3b show details of the annular reinforcement wall 122. FIG. 3a provides a perspective of the rotating turbine portion 116 and of the rotating compressor portion 118 while FIG. 3b highlights details of the static compressor portion 124 and of the static turbine portion 126.

Figure 4B:
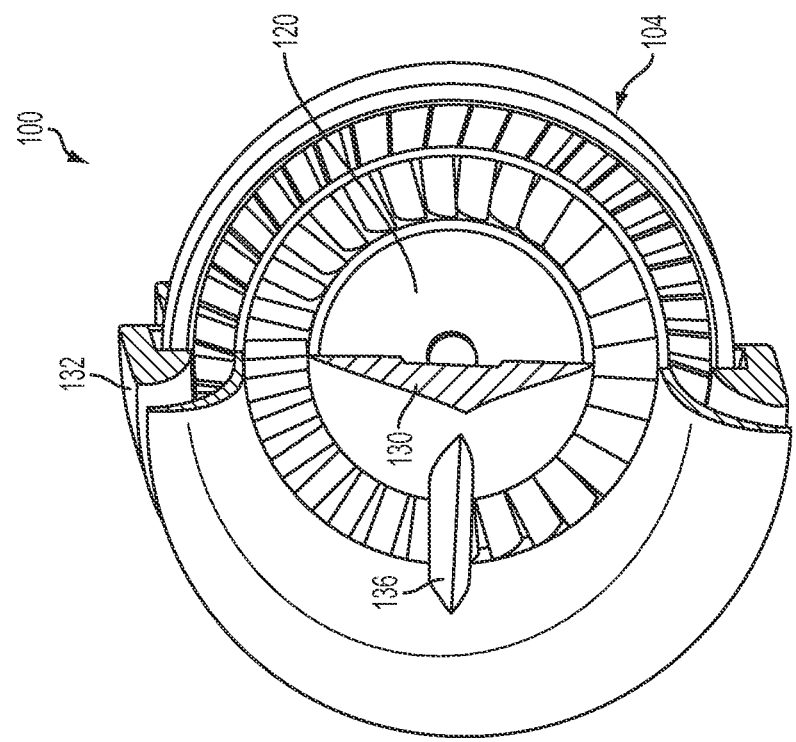
FIG. 4b is a front elevation, partial cutaway view of the rotary engine of FIG. 1.
Figure 4A:
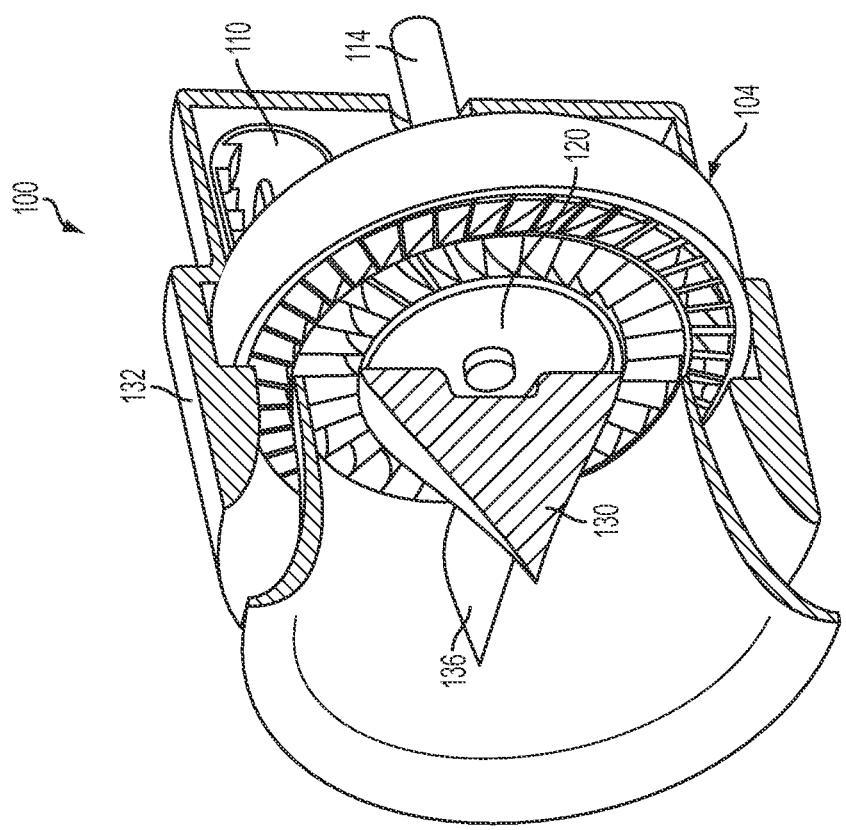
FIG. 4a is a front perspective, partial cutaway view of the rotary engine of FIG. 1.

FIG. 4a is a front perspective, partial cutaway view of the rotary engine of FIG. 1. FIG. 4b is a front elevation, partial cutaway view of the rotary engine of FIG. 1. Both FIGS. 4a and 4b show a support 136 for the cone 130, as well as some more details of the rotor assembly 104.

Figure 5:
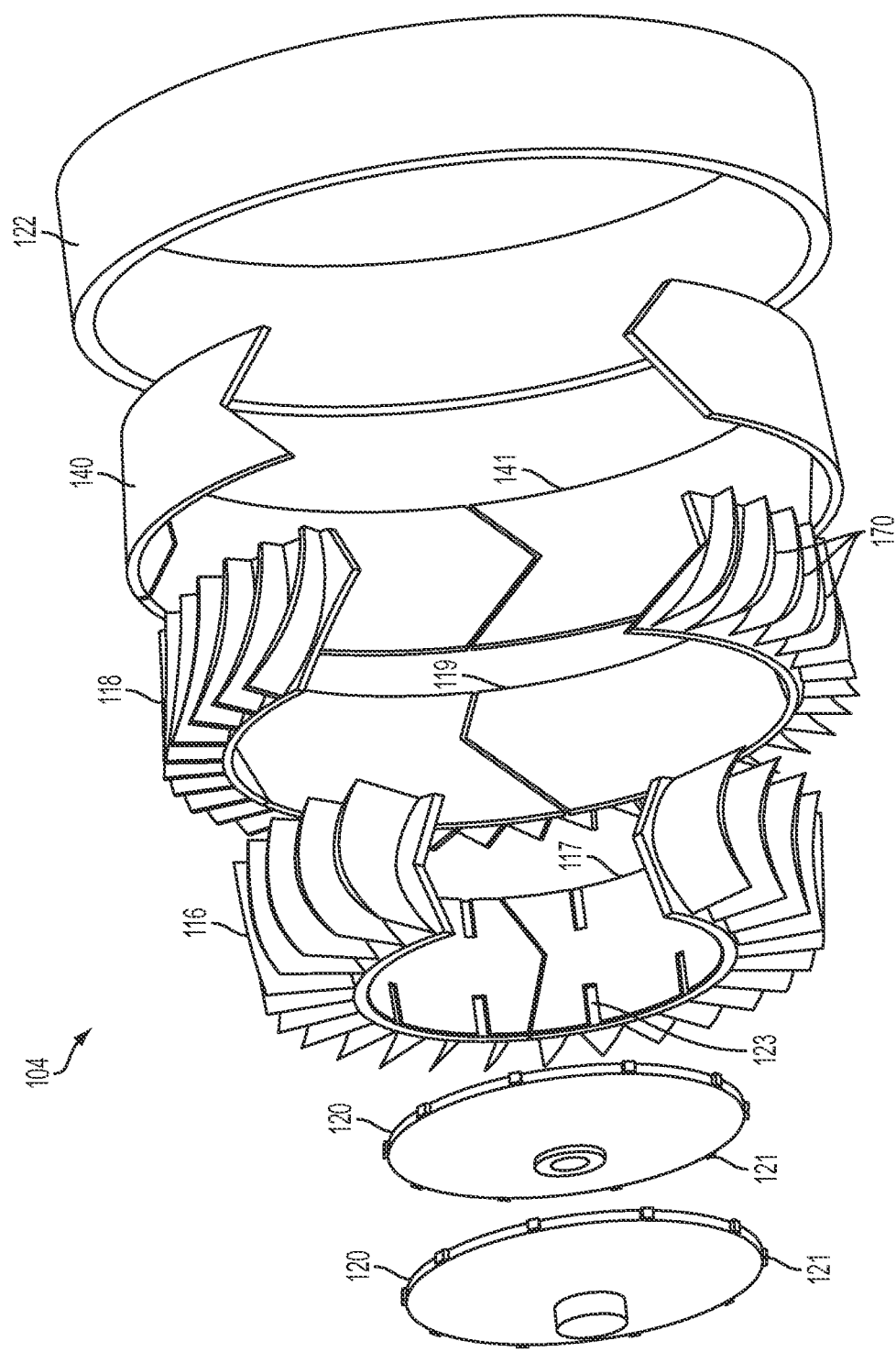
FIG. 5 is an exploded view of an example of rotor assembly.

FIG. 5 is an exploded view of an example of rotor assembly. In addition to the annular reinforcement wall 122, the rotating compressor portion 118 and the rotating turbine portion 116, the rotor assembly may comprise a protective layer 140 inserted between the rotating compressor portion 118 and the annular reinforcement wall 122. The annular reinforcement wall 122 supports the rotating turbine and compressor portions in compression, unlike traditional turbine engines in which rotating components are primarily supported in tension from their rotational axis. At high angular velocity, compressive stress in blades 170 of the rotating compressor portion 118 may damage the annular reinforcement wall 122. To avoid this problem, the protective layer 140 formed of a thin layer of metal, or any other suitable material, may in an embodiment be added between the rotating compressor portion 118 and the annular reinforcement wall 122 to distribute local high stresses from the blades 170 over a broader area of the annular reinforcement wall 122. Alternatively, the protective layer 140 may be machined or integrated directly on top of the blades 170, as a part of the rotating compressor portion 118.

At high angular velocity, the rotating compressor portion 118, the rotating turbine portion 116 and the annular reinforcement wall 122 may not expand equally. Additionally, due to the difference in material properties, a high difference in temperature between these components might be detrimental to the integrity of the rotor assembly 104. FIG. 5 further shows an optional manner of building the rotating compressor portion 118, the rotating turbine portion 116 and the protective layer 140. Any or all of these components of the rotor assembly 104 may be formed of complementary sections such as sections 141 of the protective layer 140, sections 119 of the rotating compressor portion 118 and sections 117 of the rotating turbine portion 116. The various sections 117, 119 and 141 may thus independently expand as the rotational speed of the rotor assembly 104 increases. FIG. 5 also shows that the hubs 120 may comprise studs 121 adapted to slide into grooves 123 of the rotor assembly 104, allowing some deformation of the ensemble.

Figure 6:
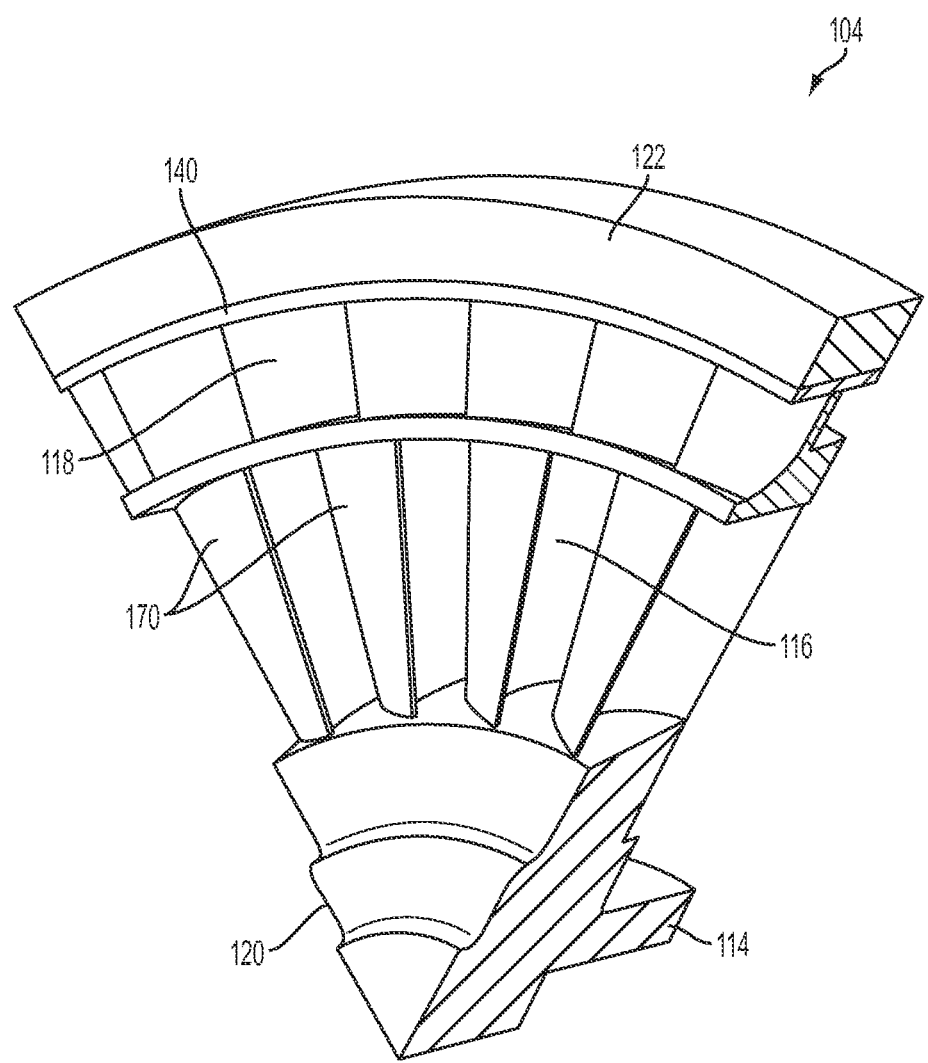
FIG. 6 is a partial perspective view of an embodiment of rotor assembly.

FIG. 6 is a partial perspective view of a rotor assembly according to an embodiment. All elements shown on FIG. 6 have been introduced hereinabove. FIG. 7 shows temperature gradients on a part of the rotor assembly of FIG. 6. Temperatures shown are in degrees Celcius (° C.). Indicia a-i reflect temperature values present on various parts of the rotor assembly 104, from a minimum of 50° C. to a maximum of nearly 700° C. The protective layer 140 is not distinguishable from the annular reinforcement layer 122 on FIG. 7 because these two elements are substantially at a same temperature level. Thermal analysis of the rotary engine 100 in operation shows that central parts of the rotating turbine portion 116 are hottest, nearing 700° C. (indicia i). This temperature level could be quite damageable to the annular reinforcement layer 122, especially if it is constructed from a composite material such as for example unidirectional carbon fibers, monofilament carbon fibers, high strength fiber windings without a linking matrix, and the like. The construction of the rotor assembly 104 prevents overheating of the annular reinforcement layer 122 owing to the placement of the rotating compressor portion 118 between the annular reinforcement layer 122 and the hot rotating turbine portion 116. Due to the flow of air from the inlet 102 being accelerated therethrough, the rotating compressor portion 118 acts as a heat insulator, or shield, between the rotating turbine portion 116 and the annular reinforcement layer 122, the latter showing a temperature of about 50° C. (indicia a). It may be observed from the thermal analysis illustrated on FIG. 7 that, in addition to compressing the flow of air from the inlet 102, the rotating compressor portion 118 further acts as a cooling channel, shielding the annular reinforcement layer 122 from the high temperatures of the rotating turbine portion 116.

Figure 8:
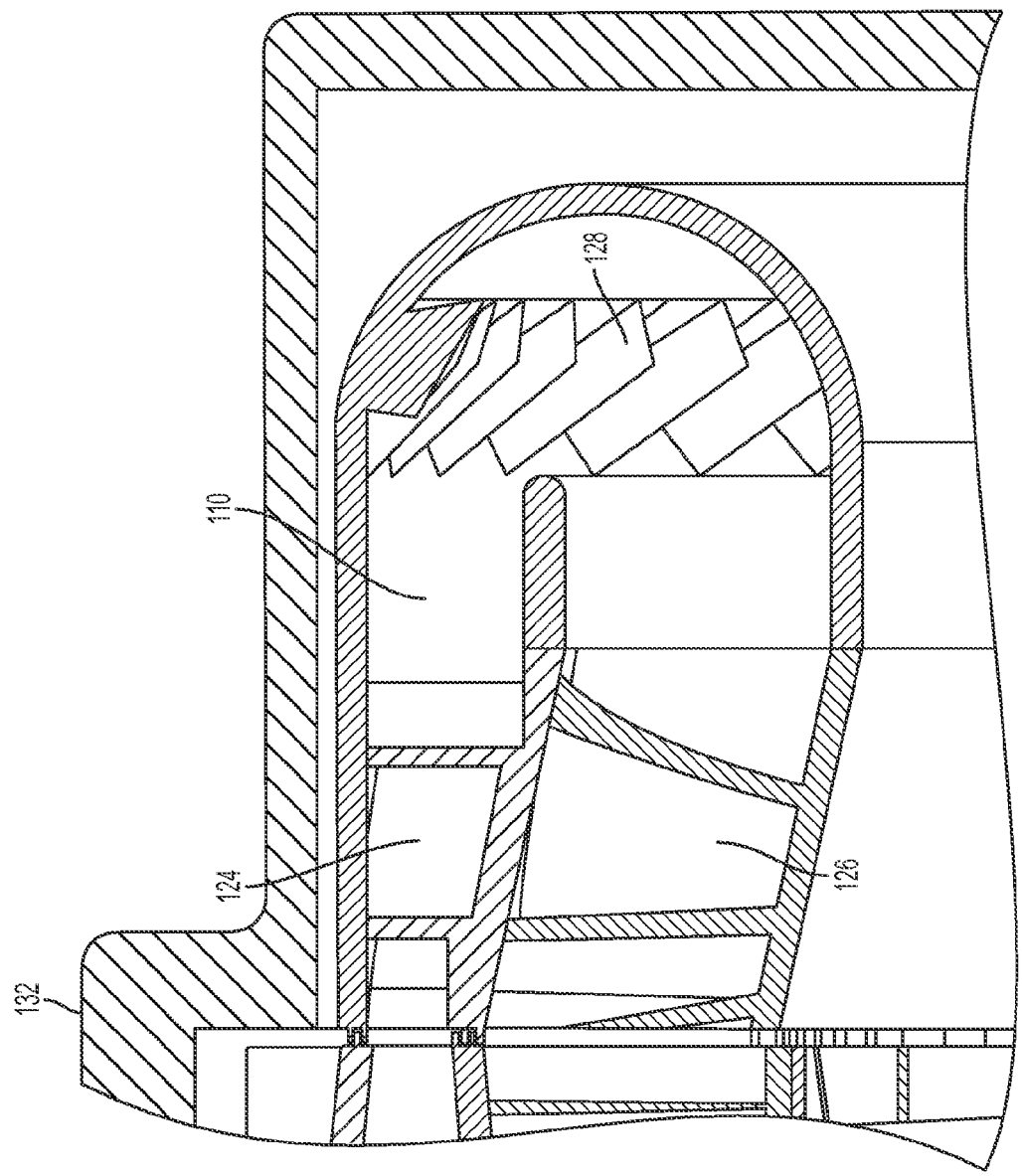
FIG. 8 is a partial cutaway view of an embodiment of stator assembly and combustion chamber.

FIG. 8 is a partial cutaway view of a stator assembly and of a combustion chamber according to an embodiment. A bleeding system (not shown) may be installed in the static compressor portion 124 to allow proper inlet starting at supersonic flow speeds, as is well-known in the art. This bleeding system may comprise a passive system of perforated inlets located radially on the stator assembly 108 or an active system using manually activated holes also located radially on the stator assembly 108. A flow of air or a premixed flow of air and fuel exits the static compressor portion 124 at an angle of approximately 45 degrees, with a speed of several meters per second. As the flow turns about 180 degrees from the static compressor portion 124, through the combustion chamber 110 and toward the static turbine portion 126, a high centrifugal force gravity field (g-field) is created. The combustion chamber 110 takes advantage of this high g-field to increase its combustion efficiency and combustion speed. Reactants enter the combustion chamber 110 at high pressure and turn toward the static turbine portion 126, generating the g-field. Positive flameholders 128 are located on an outer part of the combustion chamber 128 and oriented in a direction of the flow in order to fully take advantage of the g-field. The flameholders 128 stabilize the flame during the turn.

The combustion chamber 110 may operate with premixed air and fuel or in a non-premix configuration. In a premix configuration, fuel may be added to the flow of air in the static compressor portion 124 or upstream thereof. In the non-premix configuration, a fuel injection system (not shown) is proximate to the flameholders 128 within the combustion chamber 110, in its curved part, taking advantage of the g-field to increase combustion speed.

Figure 9:
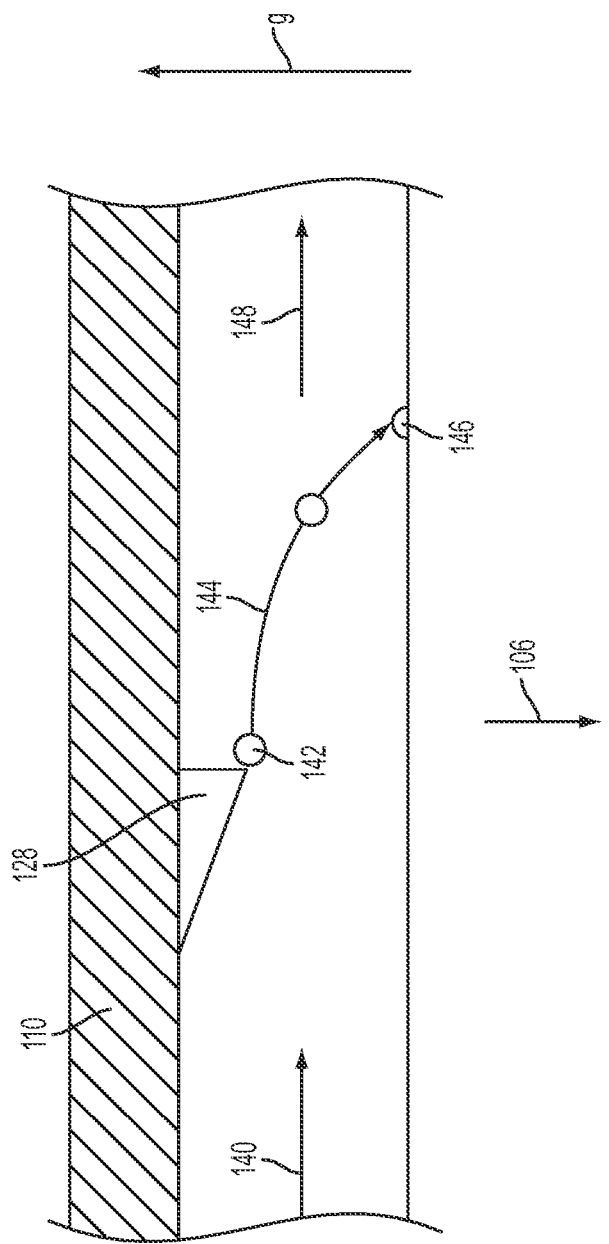
FIG. 9 is a schematic illustration showing a flame front in a combustion chamber comprising a flameholding system.

Internal functions of the combustion chamber 110 are further shown in FIG. 9, which is a schematic illustration showing a flame front in a combustion chamber comprising a flameholding system. Reactants 140 comprising a mix of air and fuel enter the combustion chamber. Reactants 140 ignite at an ignition point 142 downstream from a given flameholder 128 and are pushed in a downward direction, toward the rotation axis 106, by the flameholder 128. A flame front generally follows a direction 144 and is driven toward the rotation axis 106, reaching a flame front end 146 substantially near an internal radius of the combustion chamber 110. Combustion products 148 are expelled toward the static turbine portion 126. An arrow labeled "g" indicates a general direction of the g-field forces.

The combustion chamber 110 may be static, for example by being fixedly connected to the stator assembly 108. In some embodiments, the combustion chamber 110 may rotate within the casing 132. Returning to FIG. 1, as an example of a system for allowing the combustion chamber 110 to rotate, a gear set 134 may connect the output shaft 114 to the combustion chamber 110 in order to drive the combustion chamber 110 to rotate in a direction opposite to that of the rotor assembly 104, at the same or at a different speed of rotation. Those of ordinary skill in the art will appreciate that the combustion chamber 110 may be driven to rotate by other means and that the mention the gear set 134 is for the purpose of illustration only with no intent to restrict the scope of the present disclosure. This rotation of the combustion chamber 110 may be used to increase the g-field in the combustion chamber 110, in order to increase combustion speed. A pressure ratio of the combined rotating and static compressor portions is increased as the speed of air getting into the static compressor portion 124 increases due to the counter-rotation of the combustion chamber 110. Rotation of the combustion chamber 110 may thus allow reducing a rotational speed of the rotor assembly 104. Alternatively, rotation of the combustion chamber 110 may be used to increase the pressure ratio of the combined rotating and static compressor portions.

Figure 10:
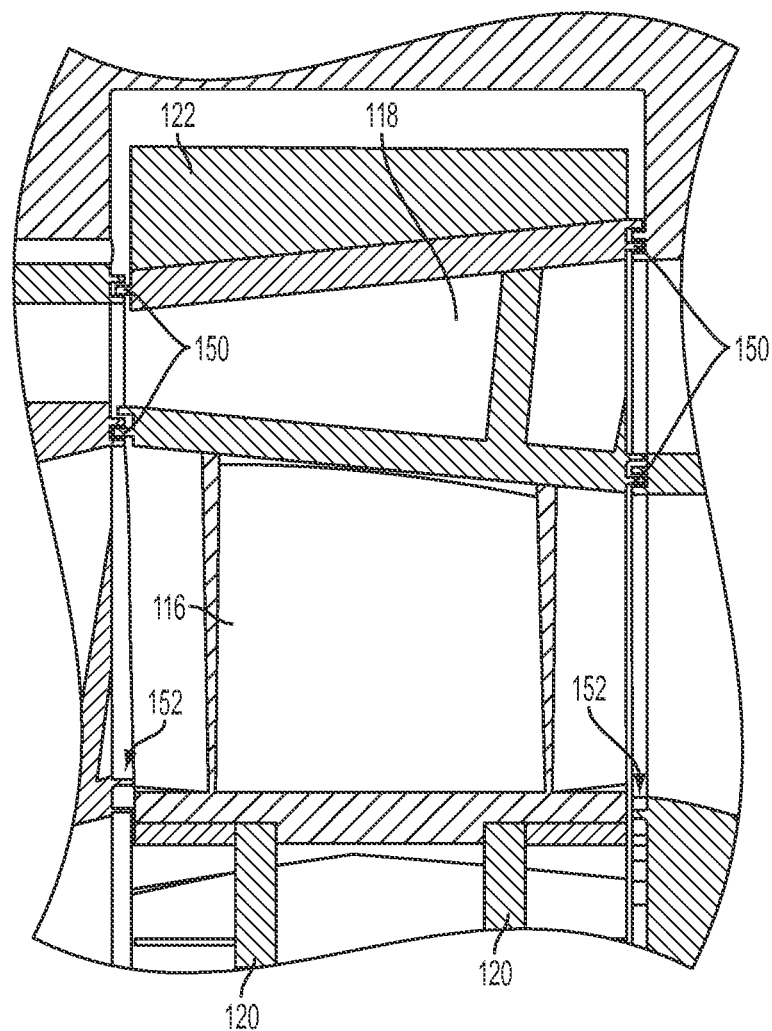
FIG. 10 shows details of an example of gas sealing system between static and dynamic parts of the rotary engine of FIG. 1.

FIG. 10 shows details of an example of gas sealing system between static and dynamic parts of the rotary engine of FIG. 1. Seals may be used to ensure that the air or the mixture of air and fuel and that resulting combustion products remain in a flow path of the rotary engine 100, from the inlet 102 through the rotor assembly 104 to the stator assembly 108 and from the stator assembly 108 through the rotor assembly 104 and to the outlet 112. An embodiment of the rotary engine 100 may thus comprise a sealing system for reducing gas leaks from the rotating compressor portion 118 toward the annular reinforcement wall 122 or toward the rotating turbine portion 116. In the same or other embodiment, the rotary engine 100 may further comprise a sealing system for reducing gas leaks from the rotating turbine portion 116 toward the rotating compressor portion 118 or toward the hubs 120. Two types of seals may be used in some embodiments of the rotary engine 100: a labyrinth seal 150 and a viscous pump 152. The structure of the labyrinth seal 150 maximizes a length of the flow path therethrough and minimizes the height of the path as shown on FIG. 10.

The viscous pump 152 has blades that build a pressure gradient to equilibrate a difference in pressure and centrifugal forces. Viscous pumps 152 may be used to reduce pressure in parts of the rotary engine 100, for example in the area of the hubs 120, in order to reduce drag.

Figure 11:
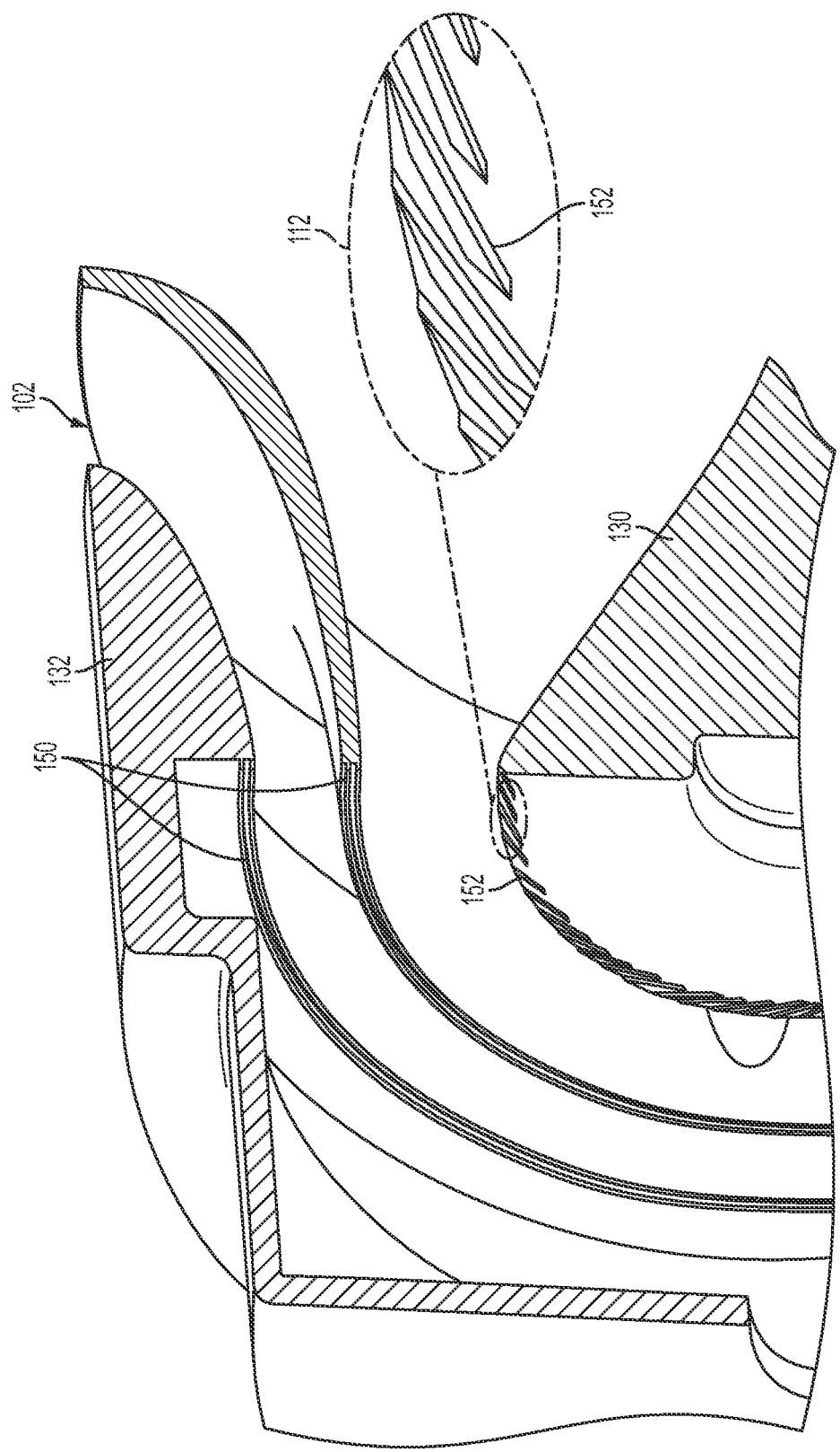
FIG. 11 shows additional details of the gas sealing system between static and dynamic parts of the rotary engine of FIG. 1.

Some embodiments of the sealing system may comprise one or more viscous pumps 152. In other embodiments, one or more labyrinth seals 150 may form the sealing system. In yet other embodiments, combinations of the viscous pump 152 and of the labyrinth seals 150 may be present in the sealing system. Placement of the labyrinth seals 150 and of the viscous pump 152 may be interchanged. Therefore, placement of the labyrinth seals 150 and of the viscous pump 152 as shown on FIGS. 10 and 11 is for illustration purposes and is not intended to limit the present disclosure.

Figure 12:
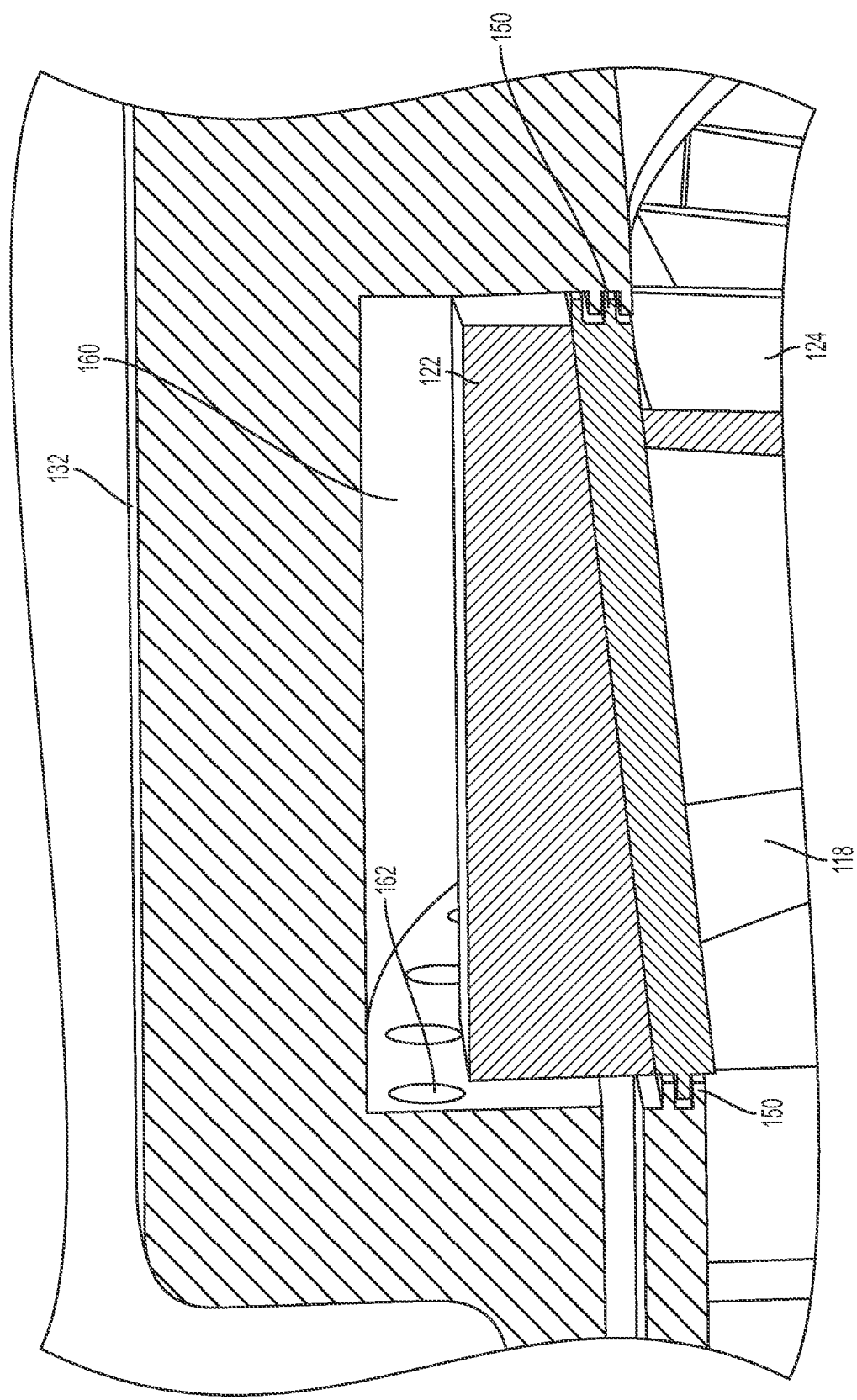
FIG. 12 is a detailed view of an embodiment of a drag and wall temperature reduction system.

FIG. 12 is a detailed view of a drag and wall temperature reduction system according to an embodiment. Drag opposing rotation of the rotor assembly 104 is reduced, in the embodiment of FIG. 12, by the injection of a light gas in a cavity 160 between the annular reinforcement wall 122 and the casing 132. The light gas, which may for instance be hydrogen or similar gas also re-used as a gaseous fuel for the rotary engine 100, is injected in the cavity 160 via injection holes 162. Convergent-divergent conduits (not shown) may lead to the injection holes 162 in order to accelerate a speed of the gas entering the cavity 160. The gas may enter the cavity 160 at a high tangential speed in order to align at least in part with a direction of rotation of the rotor assembly 104. This use of the light gas injected in the cavity 160 tends to reduce supersonic drag around the rotor assembly 104, reducing shear stress on the annular reinforcement wall 122 while also providing some level of cooling of the annular reinforcement wall 122. This effect, which is a characteristic of a reduced gas density and of a reduced Mach number of the flow, further provides a reduction in total temperature of the flow. Drain holes (not shown) on a wall of the casing 132 opposite from the injection holes 162 collect the gas from the cavity 160 and, if this gas is to be used as a fuel, channel the gas toward the fuel injection system introduced hereinabove. If a liquid fuel, for example kerosene, is used in the rotary engine 100, air may be delivered to the cavity 160 via the injection holes 162 instead of a gaseous fuel.

The manner presented hereinabove of using the rotating compressor portion 118 to shield the annular reinforcement wall 122 from heat generated by the rotating turbine portion 116 underneath may also be used for reducing a required bleed in a first stage turbine of regular gas turbine. To this end, the blades 170 and 172 of the rotating and static compressor portions 118 and 124 may be modified, when compared to those shown on FIGS. 2a and 2b, to form a thinner, bladed and substantially non-compressing channel, in which the rotating compressor portion 118 becomes a non-compressing cooling channel 118. The resulting rotor assembly may then become a turbine stage for a gas turbine. In such a case, the turbine stage and the cooling channel are supported in compression by the annular reinforcement wall. Therefore, it may be possible to use low-tensile resistant materials, such as for example ceramics, to build the blades of the cooling channel, owing to the compression support in the annular reinforcement wall.

Those of ordinary skill in the art will realize that the description of the rotary engine and rotor assembly are illustrative only and are not intended to be in any way limiting. Other embodiments will readily suggest themselves to such persons with ordinary skill in the art having the benefit of the present disclosure. Furthermore, the disclosed rotary engine and rotor assembly may be customized to offer valuable solutions to existing needs and problems of gas turbine design.

In the interest of clarity, not all of the routine features of the design and implementation of the rotary engine and rotor assembly are shown and described. It will, of course, be appreciated that in the development of any such actual implementation of the rotary engine and rotor assembly, numerous implementation-specific decisions may need to be made in order to achieve the developer's specific goals, such as compliance with application- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of gas turbines having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A rotary engine, comprising:
   a rotor assembly comprising:
   a rotating turbine portion positioned for revolving around an axis of the rotary engine, a rotating compressor portion encircling the rotating turbine portion, and an annular reinforcement wall encircling the rotating compressor portion;
   a stator assembly comprising:
   a static turbine portion positioned upstream of the rotating turbine portion for communication therewith, and a static compressor portion positioned downstream of the rotating compressor portion for communication therewith; and a combustion chamber positioned downstream of the static compressor portion and upstream of the static turbine portion for communication therewith, the combustion chamber rotating co-axially with the rotor assembly.

2. The rotary engine of claim 1, wherein the rotating compressor portion shields the annular reinforcement wall from heat present in the rotating turbine portion and wherein the combustion chamber rotates in a direction opposite a direction of rotation of the rotor assembly.

3. The rotary engine of claim 1, comprising:
   an inlet for delivering air into the rotating compressor portion;
   a fuel injection system for delivering fuel in the rotary engine;
   an ignition system for igniting an air and fuel mixture creating a reactant in the combustion chamber and turned toward the static turbine portion operable to generate a g-field; and
   an outlet for expelling combustion products from the rotating turbine portion.

4. The rotary engine of claim 3, wherein:
   the rotating compressor portion is configured to increase a velocity of air delivered through the inlet; the static compressor portion is configured to slow down and compress the air delivered thereto by the rotating turbine portion before admission of the air into the combustion chamber; the static turbine portion is configured to convert gas pressure from the combustion chamber into kinetic energy;

and the rotating turbine portion is configured to retrieve the kinetic energy from the static turbine portion.

5. The rotary engine of claim 4, comprising an output shaft operably connected to the rotor assembly for converting the kinetic energy into mechanical torque.

6. The rotary engine of claim 4, wherein the outlet is configured to expel combustion products from the rotating turbine portion at high kinetic energy level for generating thrust.

7. The rotary engine of claim 6, wherein:
the inlet is positioned radially on the rotary engine; and
the outlet is positioned axially on the rotary engine.

8. The rotary engine of claim 3, wherein the reactant ignites at an ignition point and wherein the reactant is pushed in a downward direction toward the axis of the rotary engine.

9. The rotary engine of claim 1, wherein the combustion chamber comprises one or more flameholders for stabilizing combustion of an air and fuel mixture and for creating a flame front wherein the flame front end is directed towards an internal radius of the combustion chamber.

10. The rotary engine of claim 1, wherein the rotor assembly comprises a protective layer positioned between the rotating compressor portion and the annular reinforcement wall, and wherein the combustion chamber rotates in a direction opposite a direction of rotation of the rotor assembly and wherein the combustion chamber rotates at a speed that is different than a speed of rotation of the rotor assembly.

11. The rotary engine of claim 1, wherein:
the rotating and static compressor portions form a supersonic impulse compressor; and the rotating and static turbine portions form a supersonic impulse turbine.

12. A rotary engine comprising:
a rotor assembly including
a rotating turbine portion positioned for revolving around an axis of the rotary engine,
a rotating compressor portion encircling the rotating turbine portion and
an annular reinforcement wall encircling the rotating compressor portion; and
a stator assembly including
a static turbine portion positioned upstream of the rotating turbine portion for communication therewith, and a static compressor portion positioned downstream of the rotating compressor portion for communication therewith, and
a combustion chamber positioned downstream of the static compressor portion and upstream of the static turbine portion for communication therewith, the combustion chamber being aligned with the axis of the rotary engine to rotate co-axially with the rotor assembly, the static turbine portion and the static compressor portion being static with respect to the rotating combustion chamber.

13. The rotary engine of claim 12, wherein the rotating compressor portion shields the annular reinforcement wall from heat present in the rotating turbine portion and wherein the combustion chamber rotates in a direction opposite to a direction of rotation of the rotor assembly.

14. The rotary engine of claim 12, comprising
an inlet for delivering air into the rotating compressor portion,
a fuel injection system for delivering fuel in the rotary engine,
an ignition system for igniting an air and fuel mixture creating a reactant in the combustion chamber and turned toward the static turbine portion operable to generate a g-field, and
an outlet for expelling combustion products from the rotating turbine portion.

15. The rotary engine of claim 14, wherein the rotating compressor portion is configured to increase a velocity of air delivered through the inlet, the static compressor portion is configured to slow down and compress the air delivered thereto by the rotating turbine portion before admission of the air into the combustion chamber, the static turbine portion is configured to convert gas pressure from the combustion chamber into kinetic energy, and the rotating turbine portion is configured to retrieve the kinetic energy from the static turbine portion.

16. The rotary engine of claim 15, comprising an output shaft operably connected to the rotor assembly for converting the kinetic energy into mechanical torque.

17. The rotary engine of claim 15, wherein the outlet is configured to expel combustion products from the rotating turbine portion at high kinetic energy level for generating thrust.

18. The rotary engine of claim 17, wherein the inlet is positioned radially on the rotary engine, and the outlet is positioned axially on the rotary engine.

19. The rotary engine of claim 14, wherein the reactant ignites at an ignition point and wherein the reactant is pushed in a downward direction toward the axis of the rotary engine.

20. The rotary engine of claim 12, wherein the combustion chamber comprises one or more flameholders for stabilizing combustion of an air and fuel mixture and for creating a flame front, and wherein the flame front end is directed towards an internal radius of the combustion chamber.

21. The rotary engine of claim 12, wherein the rotor assembly comprises a protective layer positioned between the rotating compressor portion and the annular reinforcement wall, and wherein the combustion chamber rotates in a direction opposite to a direction of rotation of the rotor assembly and wherein the combustion chamber rotates at a speed that is different than a speed of the rotor assembly.

22. The rotary engine of claim 12, wherein the rotating and static compressor portions form a supersonic impulse compressor; and the rotating and static turbine portions form a supersonic impulse turbine.

23. A rotary engine comprising a rotating combustion chamber including an inlet for delivering air into a static compressor portion, a fuel injection system for delivering fuel in the rotating combustion chamber, an ignition system for igniting an air and fuel mixture creating a reactant in the rotating combustion chamber and wherein the reactant is turned toward a static turbine portion operable to generate a g-field, and an outlet for expelling combustion products from the rotating combustion chamber, wherein the rotating combustion chamber is configured to rotate co-axially with the static compressor portion and the static turbine portion.

24. The rotary engine of claim 23, wherein the reactant ignites at an ignition point and wherein the reactant is pushed in a downward direction toward the axis of the rotary engine.

25. The rotary engine of claim 23, wherein the combustion chamber further comprises at least one flameholder for stabilizing combustion of an air and fuel mixture and for creating a flame front, wherein the flame front end is directed towards an internal radius of the combustion chamber.

* * * * *